US012577389B2

(12) United States Patent
Schwabe et al.

(10) Patent No.: US 12,577,389 B2
(45) Date of Patent: Mar. 17, 2026

(54) THERMOPLASTIC MOULDING MATERIALS WITH IMPROVED PROPERTY PROFILE

(71) Applicant: CLARIANT INTERNATIONAL LTD, Muttenz (CH)

(72) Inventors: Jeremia Schwabe, Gersthofen (DE); Erik Hauck, Gersthofen (DE); Felix Kirschvink, Frankfurt am Main (DE); Sebastijan Bach, Charlotte, NC (US); Gabriele Stiehl, Schwalbach am Taunus (DE); Robert Turner, Cincinnati, OH (US); Torsten Lindner, Schwalbach am Taunus (DE); Christian Neu, Schwalbach am Taunus (DE)

(73) Assignee: CLARIANT INTERNATIONAL LTD, Muttenz (CH)

( * ) Notice: Subject to any disclaimer, the term of this patent is extended or adjusted under 35 U.S.C. 154(b) by 792 days.

(21) Appl. No.: 17/794,275

(22) PCT Filed: Jan. 25, 2021

(86) PCT No.: PCT/EP2021/051625
§ 371 (c)(1),
(2) Date: Jul. 21, 2022

(87) PCT Pub. No.: WO2021/151838
PCT Pub. Date: Aug. 5, 2021

(65) Prior Publication Data
US 2023/0084553 A1 Mar. 16, 2023

Related U.S. Application Data

(60) Provisional application No. 63/138,855, filed on Jan. 19, 2021, provisional application No. 62/966,394, filed on Jan. 27, 2020.

(51) Int. Cl.
C08L 53/02 (2006.01)
C08L 23/12 (2006.01)
(Continued)

(52) U.S. Cl.
CPC ............. C08L 53/025 (2013.01); C08L 23/12 (2013.01); C09J 123/12 (2013.01);
(Continued)

(58) Field of Classification Search
CPC ........ C08L 53/025; C08L 23/12; C08L 51/06; C08F 255/02; C08F 222/06
See application file for complete search history.

(56) References Cited

U.S. PATENT DOCUMENTS 5,026,756 A 6/1991 Arendt
5,461,111 A 10/1995 Modic et al.
(Continued)

FOREIGN PATENT DOCUMENTS

CN 104629175 A 5/2015
CN 109467644 A 3/2019
(Continued)

OTHER PUBLICATIONS

Talas (Kraton Material Safety Data Sheet, 2002) (Year: 2002).*
(Continued)

*Primary Examiner* — Catherine S Branch
*Assistant Examiner* — Olga Lucia Donahue

(57) ABSTRACT
The invention relates to thermoplastic moulding materials comprising styrene block copolymers and propylene-based copolymers, wherein the SBC polymers comprise a styrene content of 5 to 40% by weight and the backbone of the propylene copolymers has a weight-average molecular weight $M_w < 10\ 000$ g/mol. The thermoplastic moulding
(Continued)

materials are suitable for affixing granules due to their melt viscosity and their mechanical properties.

18 Claims, 1 Drawing Sheet

(51) Int. Cl.
    *C09J 123/12*        (2006.01)
    *C09J 153/02*        (2006.01)
(52) U.S. Cl.
    CPC ..... *C09J 153/025* (2013.01); *C08L 2205/025* (2013.01); *C08L 2205/035* (2013.01)

(56) References Cited

U.S. PATENT DOCUMENTS

| | | | |
|---|---|---|---|
| 7,439,305 B2 | 10/2008 | Hoffmann et al. | |
| 10,507,144 B2 | 12/2019 | Stiehl et al. | |
| 2019/0276713 A1 | 9/2019 | Steib et al. | |
| 2019/0382631 A1* | 12/2019 | Gu ....................... | C09J 123/142 |
| 2021/0147726 A1 | 5/2021 | Schwabe | |
| 2021/0277216 A1 | 9/2021 | Schwabe | |

FOREIGN PATENT DOCUMENTS

| | | |
|---|---|---|
| CN | 109467644 B | 5/2021 |
| DE | 112016001247 T5 | 12/2017 |
| EP | 3333234 A1 | 6/2018 |
| EP | 3453408 A1 | 3/2019 |
| EP | 3271436 B1 | 8/2019 |
| JP | 2002105438 A | 4/2002 |
| JP | 2005248017 | 9/2005 |
| JP | 2007284574 A | 11/2007 |
| JP | 2008510031 A | 4/2008 |
| JP | 2009126920 A | 6/2009 |
| JP | 2017036354 A | 2/2017 |
| WO | 2006/020309 A1 | 2/2006 |
| WO | 2017/132119 A1 | 8/2017 |
| WO | 2018/073088 A1 | 4/2018 |

OTHER PUBLICATIONS

C.W. Paul (Hot melt adhesives, MRS Bulletin, Jun. 2003, p. 440-444). (Year: 2003).*

International Search Report and Written Opinion dated May 17, 2021, issued in corresponding International Patent Application No. PCT/EP2021/051625.

Galli et al., "New frontiers in polymer blends: The synthesis alloys", Acta Polymerica 39 (1988) Nr. 1/2, pp. 81-90.

Ho et al., "Functionalization of polypropylene via melt mixing", Polymer, 1993, vol. 34, No. 15, pp. 3264-3269.

Picchioni et al., "Solid-State Modification of Polypropylene (PP): Grafting of Styrene on Atactic PP", Macromol. Symp., 176, (2001) pp. 245-263.

* cited by examiner

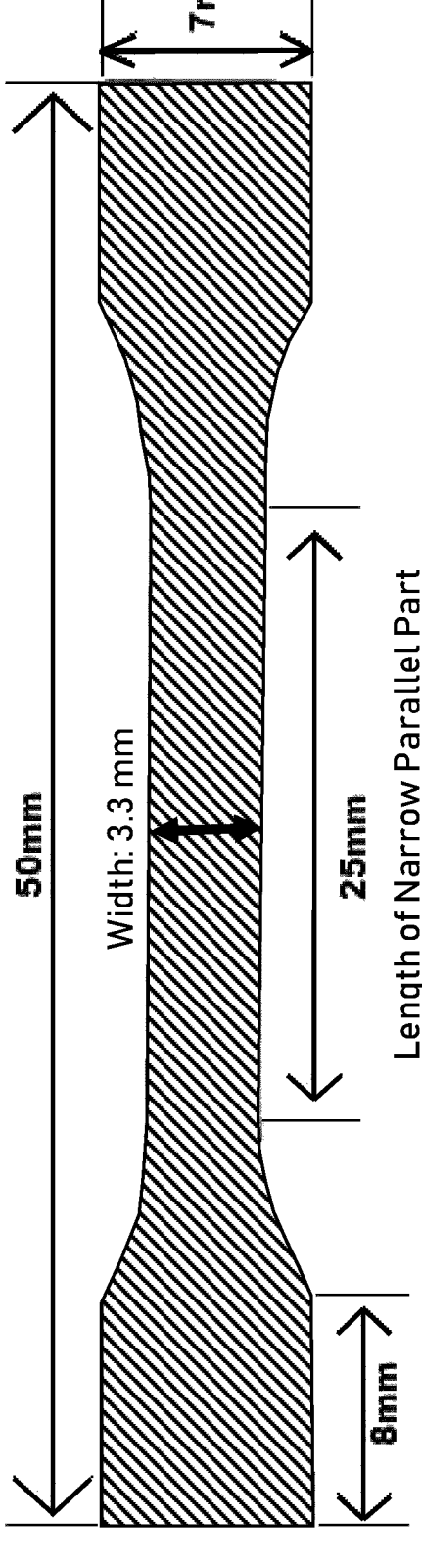

THERMOPLASTIC MOULDING MATERIALS WITH IMPROVED PROPERTY PROFILE

FIELD

The invention relates to thermoplastic moulding materials with improved mechanical properties for use in a, or as sprayable, structure-forming hot melt adhesive, comprising styrene block copolymers (SBC) and propylene-based polymers, optionally grafted with styrene or carboxylic anhydrides.

The thermoplastic moulding material according to the invention and the hot melt adhesive based thereon are suitable for adhesive bonding of substrates with one another or for affixing powder or granules to substrates of any kind, wherein the hot melt adhesives may contain, in addition to the thermoplastic moulding materials according to the invention, tackifiers, plasticizers, organic or inorganic pigments, fillers, flame retardants, stabilizers, antistatics, antioxidants and light stabilizers.

BACKGROUND

Hot melt adhesives are thermoplastic compositions solid at room temperature. When by heating they are converted into the liquid or molten state, i.e. the hot melt adhesive is open, the hot melt adhesive may be applied to a substrate. When a second substrate is applied to the hot melt adhesive before it has re-cooled to the solid state, an adhesive bond which bonds the two substrates may be formed. The hot melt adhesive has an open time optimized for the intended use and effects permanent adhesive bonding of the adherends. Hot melt adhesives typically contain a cohesive base polymer, an adhesive tackifier and optionally waxes, plasticizers (oils) and further additives. Typical hot melt adhesives and their function are described in U.S. Pat. No. 5,026,756.

Cohesive base polymers used are polymers such as, for example, natural and synthetic rubbers, polyacrylates, polyisobutylenes, polyolefin(s), polyesters, polychloroprenes, polyvinyl ethers, polyurethanes, styrene block copolymers (SBC) comprising styrene-butadiene-styrene (SBS), styrene-isoprene-styrene (SIS), styrene-isoprene-butadiene-styrene (SIBS), styrene-ethylene-butadiene-styrene (SEBS), styrene-ethylene-propylene (SEP) or styrene-ethylene-propylene-styrene (SEPS) block copolymers. These base polymers are generally responsible for the cohesive effect of the adhesive system.

The adhesive effect of hot melt adhesives is determined primarily by the tackifier which often is or contains a resin. These resins are for example low molecular weight products from the $C_5$- or $C_9$-stream of crude oil processing, often contain aromatics and usually have a glass transition temperature above room temperature.

Thus the admixing of resins into hot melt adhesive formulations increases the glass transition temperatures of the formulations and such hot melt adhesives therefore suffer from reduced low-temperature flexibility and the temperature range in which the hot melt adhesive may be used is limited.

Also employed as resins are polyterpene resins, natural and modified colophony resins, in particular resin esters, glycerol esters of wood resins, phenol-modified pentaerythritol esters and phenol-modified terpene resins. Such resin types contain substances which are an irritant/a health concern such as abietic acid and may cause allergies, as a result of which they are questionable for applications in the hygiene sector, for foodstuffs packaging and in the medical sector.

Resins typically have a density of greater than 1 g/cm³ in some cases. The use of such resins in hot melt adhesive formulations therefore results in an increase in density, in particular in formulations comprising polyolefin as the cohesive base polymer. This means that at a constant application volume more hot melt adhesive by weight is required which is both a negative cost factor and results in a higher weight of the adhesively bonded substrates.

The plasticizer in the hot melt adhesive formulation brings about viscosity reduction of the adhesive composition and thus improves its processability and ease of application. Hot melt adhesives, particularly those based on SBC, generally contain mineral oils as plasticizers, in some cases in considerable amounts.

Mineral oils are crude oil-based and thus contain paraffinic, naphthenic, aromatic and polycyclic compounds as well as volatile organic compounds (VOC) which contribute to increased indoor air pollution. The compounds also referred to as mineral oil-based saturated hydrocarbons (MOSH) and mineral oil-based aromatic hydrocarbons (MOAN), are compounds classified as toxicologically hazardous due to their tendency to accumulate in human tissue. Mineral oils are generally poorly integrated in hot melt adhesive formulations and thus have a propensity for increased migration.

Hot melt adhesives have a multiplicity of possible uses. They are employed in particular for adhesive bonds that are permanent. On account of the application from the melt, hot melt adhesives can eschew solvents.

Since many hot melt adhesives are often used in direct contact with the human body or are used in everyday articles, it is advantageous when the hot melt adhesives contain no mineral oils and the lowest possible resin proportions are required, whereby they exhibit improved environmental soundness and lower toxicology and are producible in a sustainable manner.

The processing of hot melt adhesives, in particular application to the relevant substrates, may be realized via diverse methods, for example by spraying, extrusion-application, application by means of a roller, a bead or a slot die. In order to be optimally suitable for the wide variety of application methods the hot melt adhesive must have rheological properties appropriate to the application method.

In hot melt adhesive technology spray-application is a commonly used application technique. In spin-spraying a melt thread exits a spray nozzle, is optionally extended by an air stream without tearing off and is then deposited on a substrate in a spiral pattern. The application temperatures are 150° C. to 250° C. depending on the material. Conventional hot melt adhesive formulations based on SBCs but also polyolefins are difficult to spray at temperatures of 160° C. Poor spray patterns result and severely limit the field of use. Higher application temperatures result in increased energy consumption and premature ageing of the adhesive resulting in mechanical detriments.

EP 3 271 436 (Henkel) discloses a polyolefin-based sprayable hot melt adhesive and absorbent articles containing the adhesive. The polyolefin-based sprayable hot melt adhesive is particularly suitable for spraying at low application temperatures. The sprayable hot melt adhesives having a low application temperature allow thin adhesive bonds for heat-sensitive substrates. This document does not go into the mechanical properties of the hot melt adhesive.

Sprayable hot melt adhesive compositions are primarily in the low viscosity range, thus they can be applied using this application technique. The low melt viscosity of a sprayable hot melt adhesive is normally associated with inadequate mechanical properties which negatively affect the cohesive properties of the material. These include in particular properties such as the elongation at break, restoring force or strength of the material. Substrates of this kind adhesively bonded by spray applications usually withstand only low mechanical stresses. They are optimized to ensure the most homogeneous and thus material-efficient coating of the substrate to be adhesively bonded. The adhesive bonding of the substrates is the priority here while, by contrast, the cohesive polymer is intended to ensure sufficient stability to prevent the adhesive bond per se from becoming brittle. The elasticity of the adhesive bond plays only a secondary role here. While hot melt adhesives having a higher melt viscosity can be made sprayable by increasing the application temperature, such a temperature increase results in elevated energy consumption and can lead to undesired thermally induced degradation of the components used.

The possibility of formulating hot melt adhesives based on polyolefins with SBC components is known from the prior art.

The polymer compositions described in WO 2006/020309 (Exxon) include at least one component which is a polymer derived from propylene units and at least one component which is a styrene block copolymer. The polymer compositions exhibit processing properties which are suitable for a multiplicity of applications such as, e.g. films, fibres, fabrics and nonwoven fabrics, plates, mouldings, extruded parts, thermoformed objects, etc. However, no spray applications are described since the systems claimed have melt viscosities which are too high for this application technique.

EP 3 453 408 (Fuller) relates to a hot melt adhesive composition comprising a first polymer that is propylene-based and has a Mw of no greater than about 75,000 and a polydispersity index of less than about 5 and a second polymer that is a hydrogenated styrene block copolymer with a styrene content of no greater than about 20%, and a Melt Flow when tested according to ASTM 1238 (230° C., 5 kg) of no greater than about 25 g/10 min, wherein the adhesive composition contains between 10% by weight and 18% by weight plasticizer. Propylene-based polymers with a weight-average molecular weight below 10,000 g/mol are not explicitly disclosed.

The effective formulation of hot melt adhesives could be challenging as many of the polymers used in a hot melt adhesive formulation—especially in those, where the amount of tackifiers and plasticisers is reduced—are only partially miscible because of incompatibility issues of the different polymers. The components are miscible to a high degree, but however, the achieved miscibility is not good enough to realize completely homogenous mixtures.

P. Galli, T. Simonazzi, D. Del Duca; Acta Polym. 39 (1988) 81 explain that most polymers are not mixable with each other due to their low entropy of mixtures. The mechanical properties of a blend or formulation are not only a function of its composition, they also depend on the degree of dispersion, the phase shape and the interactions of the blend phases among themselves. By controlling the morphology it is possible to control of the blend characteristics.

There have been various efforts in the state of the art to improve the compatibility of different polymers, such as polyolefin and polystyrene, by using various compatibilizers.

Grafted polymers have also been considered as compatibilizers.

R. M. Ho, A. C. Su, C. H. Wu; Polymer 34 (1993) 3264 provides a comprehensive overview of the possibilities of modifying polypropylene by grafting reactions. The disadvantage of all the syntheses described is the non-uniformity of the resulting graft copolymers and the formation of ungrafted fractions, which makes the characterization of their molecular structures and the representation of uniform properties difficult.

Therefore, miscibility problems have been approached with available solutions, such as block copolymers, which were applied to solve the compatibility issues. SBC block copolymers, which combine the properties of polymers, such as PS and PP/PE, are more specific and reliable in production and properties, so that they have been the preferred solution for related compatibility issues.

Further compatibilizers routes were not intensively followed up in the state of the art as there was no need to improve the miscibility and therefore the mechanical properties of blended polymer mixtures.

The problem of compatibilization of SBCs and propylene-based polymers has not been considered in depth until today, as fairly miscible blends of these components can be provided.

Only few examples of compatibility concepts based on grafted polymers were applied to hot melt adhesives in the state of the art.

The invention of U.S. Pat. No. 5,461,111 (Shell) provides a rigid thermoplastic composition comprising about 60-95% by weight of the polymer components of a graft copolymer comprising about 10-65% by weight of the graft copolymer of a styrene polymer grafted onto a backbone of propylene material, and, about 40-5% by weight of the polymer components of a rubber component comprising (1) from about 20-100% by weight of the rubber component of a selectively hydrogenated block copolymer which has weak styrene domains and from about 80-0% by weight of the rubber component of an olefin copolymer rubber, e.g., EPM (ethylene-propylene monomer rubber). The rigid composition has significantly improved toughness and melt viscosity and assumedly does not show a low viscosity and sprayability. The mechanical properties of the rigid thermoplastic composition were not described.

U.S. Pat. No. 7,439,305 (Henkel) relates to a hot-melt adhesive based on at least one aromatically modified polyethylene and/or polypropylene (co)polymer, one further ethylene or propylene/$C_4$ to $C_{29}$ α-olefin copolymer, at least one tackifying resin, and waxes and additives. The polyolefins and aromatically modified polyolefins have molecular weights Mn between 1,000 and 50,000 g/mol. The melting enthalpy and the pour point were not disclosed. The mechanical properties, which are relevant for special applications of the hot melt adhesive, were not considered in the teaching of this application.

However, the compatibilization levels reached by now are not sufficient for special applications, which require high mechanical stability of small amounts of polymer, such as thin polymer fibres.

Current trends are engaged in sprayable hot melt adhesives which form stable web structures for hygiene applications DE 11 2016 001 247 (Procter & Gamble) relates to an adsorbent structure for an absorption article comprising a first substrate and an absorption layer supported thereon. This absorbent layer comprises an absorption material which comprises in turn a superabsorbent polymer material, in which the absorbent structure comprises a web structure in order to immobilize the absorbent layer at least partially on the first substrate. This stated web structure has a storage modulus (G') at 21° C. of more than $1.2 \times 10^6$ Pa. The thermoplastic polymer composition has weight-average molecular weights $M_w$ greater than 10 000 g/mol. No explicit mixtures of SBC and propylene-based polymers are described.

WO2017/132119 (Procter & Gamble) discloses a super-absorbent immobilizer comprising at least 50% by weight of one or more polymers each having a peak molecular weight of at least 10 kg/mol. Polymers mentioned are selected from the group consisting of polymers and copolymers of propylene, ethylene, butene, and combinations thereof; styrenic block copolymers; polyolefins; olefin block copolymers, and combinations thereof.

Using polyolefin-based hot melt adhesive formulations, no stable web structures for fixing spatially expanding and re-contracting granules could be produced to date, since no suitable formulation having the mechanical properties critical for this application could be produced.

The object of the invention is to overcome the problems described in the state of the art and to provide improved sprayable hot melt adhesives with a well-balanced ratio of mechanical properties that may be applied by energy-efficient and material-efficient application techniques while nevertheless ensuring high mechanical stability and flexibility of the adhesive bond and thus opening up possible uses that place increased demands on the stability of the adhesive bond. Mention may be made here in particular of adhesive fibre web spray applications which affix granules or powders without impairing mass transfer with the environment and which can also stabilize expanding and contracting systems by liquid absorption.

SUMMARY OF THE INVENTION

This object is achieved according to the invention by thermoplastic moulding materials comprising
(a) at least one styrene block copolymer (SBC) having a styrene content of 5 to 40% by weight, preferably of 10 to 35% by weight, particularly preferably of 20 to 35% by weight, based on the total mass of the SBCs, and
(b) one or more propylene-based polymers (PbPs), with a PbP-backbone having a weight-average molecular weight $M_w$ of less than 10,000 g/mol, preferably of less than 9,000 g/mol, particularly preferably less than 7,000 g/mol (PbP-ng),
wherein the PbPs preferably have a melting enthalpy, measured in accordance with ISO 11357-2, below 50 J/g, preferably below 30 J/g, particularly preferably between 0 and 5 J/g, most particularly preferably of 0 J/g.

A PbP having a melting enthalpy of 0 J/g has no crystallinity.

In a preferred embodiment of the invention one or more propylene-based polymers (PbP-ngs) are grafted with 1 to 50% by weight, preferably with 3 to 30% by weight and particularly preferably with 5 to 20% by weight, based on the total weight of PbP-backbone, of vinyl-aromatic monomers (PbP-g-VAM), preferably styrene and its derivatives (PbP-g-ST).

In an alternative preferred embodiment of the invention one or more propylene-based polymers (PbP-ngs) are grafted with 0.1-20% by weight, preferably with 0.5 to 15% by weight, particularly preferably with 1 to 10% by weight, based on the total weight of PbP-backbone, of unsaturated vinyl monomers including a heteroatom (PbP-g-UVMH), preferably of carboxylic anhydrides, particularly preferably of maleic anhydride (PbP-g-MA).

BRIEF DESCRIPTION OF THE DRAWINGS

The manner of attaining some of the features will become more apparent and the disclosure itself will be better understood by reference to the following description of example forms of the disclosure taken in conjunction with the accompanying drawings, wherein FIG. 1 shows the dumbbell-shaped test specimen used for measuring certain mechanical properties of the thermoplastic molding material.

DETAILED DESCRIPTION

Definitions

Propylene-based polymers (PbPs) means in the context of this invention low molecular, linear propylene homopolymers or copolymers produced using Ziegler or metallocene catalysts which have a propylene content of at least 50% by weight or more.

PbPs cover both, PbPs which were not grafted (PbP-nq) and PbPs grafted with (i) vinyl aromatic monomers (PbP-g-VAM) including an embodiment equivalent to PbPs grafted with styrene (PbP-g-ST) or (ii) PbPs grafted with unsaturated vinyl monomers including a heteroatom (PbP-g-UVMH), such as PbPs grafted with maleic anhydridePbP-g-MAs). The term PbP-g-VAM as used in this application corresponds/is identical to the term PbP-g-St as defined in U.S. provisional 62/966,394 which priority is claimed. If this application refers only to PbPs which are not grafted, these are indicated as non-grafted PbPs (PbP-nq).

PbP-backbone means in the context of this invention the linear PbP, produced using Ziegler or metallocene catalysts, without substitution at the grafting sites. The term PbP-backbone can technically be substituted with the term PbP-ng, but both terms are used to clarify the function of the polymer for the person skilled in the art.

The PbP-ngs used in the thermoplastic moulding material according to the invention are described, for example, in WO 2018/0073088, where they are a constituent of non-sprayable permanently tacky pressure-sensitive adhesives.

The use of PbPs in the thermoplastic moulding material according to the invention ensures a better integration thereof into the SBC matrix, thus resulting in reduced migration ("bleedthrough") and reduced formation of volatile organic compounds ("VOCs").

The PbP-g-VAM or PbP-g-UVMH are manufactured by performing a graft reaction on a PbP-ng as described according to the following method:

Suitable starting materials for the production of the PbP-g-VAM or PbP-g-UVMH are PbP-ngs produced using Ziegler or metallocene catalysts and having a weight-average molecular weight $M_w$ of less than 10,000 g/mol. Preferred PbP-ngs have a melt viscosity at 170° C. between 20 and 1,000 mPa·s, such as PbPs. Particularly preferred PbP-ngs are low molecular propylene homopolymers or copolymers characterized by a low crystallinity and a statistic distribution of the comonomers and a predominantly to completely atactic structure of the polypropylene parts as received by using metallocene catalyst systems.

Suitable materials preferably comprise propylene and one or more other monomers selected from the group consisting of ethylene and higher $\alpha$-olefins of $C_4$-$C_{18}$. The PbP-ngs particularly preferably comprise propylene an ethylene.

Vinyl-aromatic monomers (VAM) such as styrene, or styrene derivatives that are substituted in the ring and have linear or branched alkyl substituents such as α-methylstyrene, p-tert-butylmethylstyrene, 1,3-dimethylstyrene, or alkoxylated styrene derivatives are suitable as grafting components, preferably styrene and its derivatives, particularly preferably styrene. The VAM-component is used in an amount of 0.1 to 50% by weight of the starting material.

Unsaturated vinyl monomers including a heteroatom (UVMH), preferably carboxylic anhydrides, particularly preferably maleic anhydride (MA) are suitable as grafting components. The UVMH-component is used in an amount of 0.1 to 20% by weight of the starting material.

Suitable radical initiators are components which sufficiently decay into radicals under reaction conditions, such as organic peroxides, for instance alkyl-, aryl- or acyl-peroxides such as di-tert.-butyl peroxide, dibenzoyl peroxide or dicumyl peroxide, peroxyesters such as tert-butyl peracetat or tert.-butyl perbenzoat and hydroperoxides such as tert.-butylhydro peroxid or cumol hydroperoxide. Further possible radical initiators are aliphatic azo compounds such as azo-bis-(2-methyl propionitril) or 2,2'-azo-bis-(2,4-dimethyl valeronitril). Dialkyl peroxides are preferred. Di-tert.-butylperoxid is particularly preferred. The radical initiator is used in an amount of 0.1 to 50% by weight of the PbP.

The reaction of the PbP with the grafting component can take place continuously as well as discontinuously. With the discontinuous process the PbP-ng is heated to a temperature above the melting temperature of the PbP-ngs, preferably between 100° C. and 200° C., particularly preferably between 130° C. and 180° C., and the grafting component as well as the radical initiator are added continuously for an adequate period while agitating or in one or more portions and if applicable under an inert gas atmosphere. After finished dosage, optionally after addition of an additional amount of radical initiator, a post reaction at the same or a different temperature may follow. Volatile components which were generated during the reaction or superfluous volatile starting materials may be distilled under vacuum and/or be separated by stripping with inert gas.

Such modified PbP-ngs grafted with (i) vinyl-aromatic monomers such as styrene, or styrene derivatives that are substituted in the ring and have linear or branched alkyl substituents such as α-methylstyrene, p-tert-butylmethylstyrene, 1,3-dimethylstyrene, or alkoxylated styrene derivatives (PbP-g-VAM), preferably PbP-g-ST or grafted with (ii) unsaturated vinyl monomers including a heteroatom such as carboxylic anhydrides (PbP-g-UVMH), preferably maleic anhydride PbP-g-MA have a wide range of possible applications as compatibilizer or adhesive base polymer in hot melt adhesives, especially in combination with SBCs and/or PbP-ngs.

The PbP-g-VAMs according to the invention are characterized by a PbP-backbone with a weight-average molecular weight of less than 10,000 g/mol, preferably less than 9,000 g/mol, particularly preferably less than 7,000 g/mol, a styrene content between 1 and 50% by weight, preferably, between 3 and 30% by weight, particularly preferably between 5 and 20% by weight and a melting enthalpy below 50 J/g, preferably below 30 J/g, more preferably between 0 and 5 J/g and particularly preferably of 0 J/g.

The PbP-g-UVMHs according to the invention are characterized by a PbP-backbone with a weight-average molecular weight of less than 10,000 g/mol, preferably less than 9,000 g/mol, particularly preferably less than 7,000 g/mol, a carboxylic anhydride content between 0.1 and 20% by weight, preferably between 0.5 and 15% by weight, particularly preferably between 1 and 10% by weight, and a melting enthalpy below 50 J/g, preferably below 30 J/g, more preferably between 0 and 5 J/g and particularly preferably of 0 J/g.

In a preferred embodiment the PbP-g-VAMs or PbP-g-UVMHs according to the invention are characterized by a weight-average molecular weight of less than 20,000 g/mol, preferably less than 15,000 g/mol, particularly preferably less than 10,000 g/mol.

In an alternative embodiment the thermoplastic moulding material comprises a styrene block copolymer (SBC) and one or more PbPs selected from the group consisting of PbP-ngs having a weight-average molecular weight $M_w$ of less than 10,000 g/mol, PbP-g-VAMs having a weight-average molecular weight of less than 20,000 g/mol and PbP-g-UVMHs having a weight-average molecular weight of less than 20,000 g/mol, wherein the SBC comprises a styrene content of 5 to 40% by weight preferably of 10 to 35% by weight, particularly preferably of 20 to 35% by weight, based on the total mass of the SBCs.

In a preferred embodiment the sprayability and the improved mechanical properties of the thermoplastic moulding material are achieved by PbPs, which comprise at least one PbP-ng having a pour point, determined according to ASTM D97, below 50° C., preferably below 30° C. and more preferably below 25° C. or at least one PbP-g-VAM or PbP-g-UVMH having a pour point, determined according to ASTM D97, is below 85° C. preferably below 60° C., more preferably below 55° C.

In another preferred embodiment the PbPs have a melt viscosity at 170° C., measured in accordance with DIN 53019, of 1-1,000 mPas, preferably of 1-500 mPas, particularly preferably of 1-300 mPas, which further contributes to the sprayability of the thermoplastic moulding material.

In a preferred embodiment of the invention the thermoplastic moulding material comprises both one or more PbP-ng and (i) one or more PbP-g-VAM, preferably one or more PbP-g-ST or (ii) one or more PbP-g-UVMH, preferably one or more PbP-g-MA in varying proportions by weight. Such an embodiment facilitates a better miscibility of the polymer components and therefore improved mechanical properties. Surprisingly the combination of PbP-ng and (i) PbP-g-VAM or (ii) PbP-g-UVMH enables a lower viscosity of the thermoplastic moulding material in comparison to the thermoplastic moulding material solely comprising PbP-ng although the PbP-g-VAM, preferably PbP-g-ST or PbP-g-UVMH, preferably PbP-g-MA itself has a higher viscosity than the PbP-ng. Another technical feature of this embodiment is a reduced migration of the components.

The PbP-g-VAM or PbP-UVMH polymer can have the same or a different polymer backbone as the PbP-ng. Preferably the PbP-backbone of the PbP-g-VAM or PbP-g-UVMH polymer is the same as of the PbP-ng.

In a preferred embodiment, the thermoplastic moulding material consists of SBCs and PbPs, which can be PbP-ng and/or PbP-g-VAM or PbP-g-UVMH derived from the same or another PbP-backbone. Preferably the PbP-g-VAM or PbP-g-UVMH is derived from the same PbP-backbone as the PbP-ng.

In a preferred embodiment, the PbP-backbone is a copolymer of propylene and another monomer selected from the group consisting of ethylene and $C_4$-$C_{18}$ α-Olefins.

The thermoplastic moulding material according to the invention may comprise further polyolefin-based copolymers in addition to the PbPs having a $M_w$ of less than 10,000 g/mol.

In a preferred embodiment, the PbPs have a glass transition temperature $T_g$, determined by DSC in accordance with DIN EN ISO 11357-2, of less than −20° C., preferably less than −30° C. and particularly preferably less than −40° C.

In a preferred embodiment the PbP-backbone was produced by metallocene catalysis.

The PbPs are preferably random copolymers of propylene with a propylene proportion of less than 90% by weight, preferably with a propylene proportion between 60-85% by weight.

The PbPs preferably are copolymers of propylene and ethylene, wherein said copolymer is derived from 60-85% by weight of propylene and from 15-40% by weight of ethylene.

The SBC may comprise one or more SBCs according to the invention.

The SBC preferably has a weight-average molecular weight $M_w$ of more than 30,000 g/mol, preferably of more than 40,000 g/mol, particularly preferably of more than 50,000 g/mol.

In a preferred embodiment, the SBC has a melt flow rate MFR (230° C./2.16 kg) of between 5-250 g/10 min, preferably between 10-150 g/10 min, particularly preferably between 20-80 g/10 min, determined in accordance with ASTM 1238.

In a preferred embodiment the SBC has a melting enthalpy below 10 J/g, preferably below 5 J/g and thereby an amorphous structure, resulting in a rubber-like behaviour which influences the mechanical properties of the thermoplastic material.

The thermoplastic moulding material preferably comprises 10-55% by weight, more preferably 20-45% by weight, particularly preferably 25-40% by of weight SBCs, based on the total mass of the thermoplastic moulding material.

The thermoplastic moulding material preferably comprises 10-80% by weight PbPs, particularly preferably 20-75% by weight, more particularly preferably 35-70% by weight PbPs, based on the total mass of the thermoplastic moulding material. At these weight ratios the properties of the individual components of the corresponding moulding materials are combined in optimal fashion.

The SBC is preferably selectively hydrogenated at the double bonds in the polymer chain, what is characterized by an Iodine number below 100 g $I_2$ per 100 g of polymer, particularly preferably below 50 g $I_2$ per 100 g of polymer.

The SBC preferably is selected from the group consisting of elastomeric triblock copolymer of the ABA type, wherein A consists of rigid styrene units and B of elastomeric units, which influence the miscibility of the components. In addition to the elastomeric triblock copolymer of the ABA type, the SBC may also comprise an elastomeric diblock copolymer of the AB type or an elastomeric multiblock copolymer, of the type $[AB]_n$ wherein n is the number of blocks.

The SBC particularly preferably consists of one or more SBCs selected from the group of SEBS, SEPS and SEP polymers.

In a preferred embodiment, the melt viscosity of the thermoplastic moulding material, measured in accordance with DIN 53019 at 170° C., is between 100-30,000 mPas, preferably between 500-20,000 mPas, particularly preferably between 1,000-15,000 mPas. In these viscosity ranges an optimal spraying result is achievable with the spraying methods suitable for the application.

In a preferred embodiment, the thermoplastic moulding material has an elongation at break of more than 800%, preferably of more than 1,000%, measured in accordance with ISO 527, with the exception that the test specimen used (cf. FIG. 1) has the following dimensions deviating from the specification according to ISO 527: total length: 50 mm, width of narrow part: 3.3 mm, width at ends: 7 mm, length of narrow parallel part: 25 mm, thickness: 1 mm.

Elongation at break is a measure of the deformation behaviour of a polymer and is determined according to ISO 527 by a tensile elongation test in the same test run as for determination of tensile strength. The value for elongation at break indicates the percentage elongation of the test specimen until failure of the material.

The tensile strength is determined by a tensile elongation test according to ISO 527, with the exception that the dumbbell-shaped test specimen used (cf. FIG. 1) has the following dimensions deviating from the specification according to ISO 527: total length: 50 mm, width of narrow part: 3.3 mm, width at ends: 7 mm, length of narrow parallel part: 25 mm, thickness: 1 mm. This determines the force per unit area (reported in MPa) required to elongate the test specimen.

In a further preferred embodiment, the thermoplastic moulding material has a resilience of more than 70%, preferably of more than 80%, particularly preferably of more than 90% wherein the resilience is determined by the method described in the "Methods of measurement" section of this description. The resilience is a measure of the restoration force of the thermoplastic moulding material.

In a further preferred embodiment, the thermoplastic moulding material has a True Strain at Break at 23° C. higher than 2.2 and a Strain Hardening Index at 23° C. higher than 25.

The True Strain at Break, the Strain Hardening Index and Yield Stress are determined in accordance with the "Extensional Test Method" described in the "Methods of measurement" section of this description.

A low Yield Stress and a high Strain Hardening Index are beneficial to stabilize the net structure upon expanding due to size and shape changes of bonded particles because of adsorption of water or humidity.

The strain hardening index is a measure of the difference between initial yield stress and maximum yield stress. A value above 25 leads to a better stress distribution within the net, avoiding high local stress. This significantly increases the expandability of the net structure.

The increase of true strain at break is overall beneficial to allow the net structure to expand.

The rheological properties of the thermoplastic moulding material underline the ability to have a reasonable melt strength at said temperature in order to create a durable bond while applied via spray application and are described by the tan δ @ 100° C. and Storage Modulus G' @ 100° C.

In a further preferred embodiment, the PbPs have a density, determined according to ISO 1183 of less than 0.95 g/cm³, preferably less than 0.92 g/cm³ and particularly preferably less than 0.90 g/cm³.

In a further preferred embodiment, the PbPs have a polydispersity index of less than 5, preferably less than 3, particularly preferably less than 2.5. The polydispersity index PDI is calculated from the quotient of weight-average molecular weight $M_w$ and number-average molecular weight $M_n$ and was determined according to the standard ISO 16014.

The PbPs used for the thermoplastic moulding materials according to the invention can both assume the function of the base polymer and replace the functions of the plasticizer and the tackifier in the formulation. This results in further advantages for the user. For example, fewer components need to be melted and mixed, thus resulting in faster and more cost-effective working processes.

In a preferred embodiment, the thermoplastic moulding material is tackifier-free, which means in the sense of this invention that the tackifier content in the thermoplastic material is below 0.1% by weight.

In a further preferred embodiment, the thermoplastic moulding material is free of plasticizers such as mineral oils, naphthenic oils, paraffinic oils (e.g., cycloparaffin oils), phthalate esters, adipate esters which means in the sense of this invention that the plasticizer content in the thermoplastic material is below 0.1% by weight.

A thermoplastic moulding material which is produced without addition of tackifiers or plasticizers is particularly environmentally sound and toxicologically unconcerning and is therefore suitable for use on the human body.

In an alternative embodiment the thermoplastic moulding material preferably comprises tackifiers which positively influence the adhesion to the substrate.

The thermoplastic moulding material preferably comprises one or more of organic or inorganic pigments, fillers, flame retardants, stabilizers, antistatics, antioxidants and light stabilizers.

Preferably the antioxidant is selected from the group consisting of sterically hindered phenols and hindered amine light stabilizer (HALS), which inhibit the emerging odour of the thermoplastic moulding material. Particularly preferably the antioxidant is a hindered amine light stabilizer (HALS).

In addition, the invention relates to a process for producing the thermoplastic moulding material according to the invention by mixing at least one SBC with at least one PbP, characterized by (a) at least one SBC having a styrene content of 5 to 40% by weight, preferably of 10 to 35% by weight, particularly preferably of 20 to 35% by weight; and (b) one or more PbP having a PbP-backbone having a weight-average molecular weight $M_w$ of less than 10,000 g/mol, preferably of less than 9,000 g/mol, particularly preferably less than 7,000 g/mol, optionally grafted with 1 to 50% by weight, preferably with 3 to 30% by weight and particularly preferably with 5 to 20% by weight of vinyl-aromatic monomers (PbP-g-VAMs), preferably styrene and its derivatives (PbP-g-ST), or with 0.5 to 20% by weight, preferably with 1 to 15% by weight and particularly preferably with 3 to 10% by weight of unsaturated vinyl monomers including a heteroatom (PbP-g-UVMH), preferably of carboxylic anhydrides, particularly preferably of maleic anhydride (PbP-g-MA), wherein the PbPs have a melting enthalpy, measured in accordance with ISO 11357-2, below 50 J/g, preferably below 30 J/g, particularly preferably between 0 and 5 J/g, most particularly preferably of 0 J/g.

The process according to the invention preferably comprises mixing the at least one SBC with the at least one PbP, in particular using a co-rotating twin-screw extruder at a processing temperature between 200° C. and 250° C.

The invention further relates to a hot melt adhesive which consists of the thermoplastic moulding material according to the invention or contains said material in addition to further components.

The invention further relates to the use of the thermoplastic moulding materials according to the invention or of the hot melt adhesive according to the invention for bonding flexible and/or rigid substrates of any kind.

The hot melt adhesive or thermoplastic moulding material according to the invention are suitable for bonding flexible and/or rigid substrates of any kind, for example paper, cardboard packaging, glass, wood, polypropylene plastics (PP), polyethylene plastics (PE), acrylonitrile-butadiene-styrene-copolymer plastics (ABS), in particular for structured substrates or textile substrates such as for example fibrous nets, woven or non-woven textiles. Those skilled in the art understand structured substrates to mean substrates having a profile depth $P_t$ of greater than 1 mm.

The hot melt adhesive according to the invention or the thermoplastic moulding material according to the invention are particularly preferably used for bonding and fixing coarse-grain bulk solids, for example granules. For these applications the improved thermoplastic moulding materials or hot melt adhesives may be applied such that rather than forming a compact, homogeneous film they form a net-like air- and moisture-permeable structure. These net-like air- and moisture-permeable structures (net structures) are suitable in particular for affixing for example absorbers onto substrates of any kind. Through this type of affixing it is possible in particular to affix fillers, drying agents or moisture absorbers in hygiene articles, packaging materials, automotive parts, vehicle bodies, furniture, soft furnishings or mattresses for example and to surfaces of any type. In this case, the net structure affixes the aforementioned granules and due to the particular mechanical properties maintains a certain mechanical load by motion and expansion dependent on the liquid content.

Very surprisingly, thermoplastic moulding materials having the described features combine good processability of the moulding material, brought about by the low melt viscosity thereof, with exceptional mechanical properties. These combinations of the properties described qualify the moulding materials according to the invention for use thereof as high-performance hot melt adhesives.

Methods of Measurement

The polyolefins listed were characterized according to the listed standards. Non-standard characterizations were carried out as per the description.

Weight-Average Molecular Weight $M_w$

Determination of the weight-average molecular weights $M_w$ of the PbPs was conducted in 1,2-ortho-dichlorobenzene with a PP calibration. Measurement was carried out by gel permeation chromatography at a temperature of 135° C. Determination was carried out according to ISO 16014-1.

Determination of the weight-average molecular weights $M_w$ of the SBC was conducted in THF as a mobile phase at a flow rate of 1 mL/min with a polystyrene calibration with standards in the range of 680-1,670,000 g/mol. Measurement was carried out by gel permeation chromatography on styrene-divinylbenzene copolymer columns from PSS at a constant temperature of 40° C. For measurement a SBC polymer solution was prepared in a concentration of (2 mg Polymer)/(ml THF) and 50 μL of the solution was injected. A differential refractometer was used for detection.

Pour Point

The pour point was determined according to the standard ASTM D97.

Iodine Number

The Iodine number was determined according to the standard DIN 6162:2014.

Melt Viscosity

Determination of the melt viscosity was carried out according to the standard DIN 53019.

Polydispersity Index PDI

The polydispersity index PDI is calculated from the quotient of weight-average molecular weight $M_w$ and number-average molecular weight $M_n$ and was determined according to the standard ISO 16014-1.

Tensile Strength

The tensile strength and elongation at break of the thermoplastic moulding materials were determined according to ISO 527 save that in this case a non-standard test specimen produced by hot melt pressing and differing from the test specimen conforming to the standard in terms of its dimensions was used. The test specimens used for measuring strength and elongation at break have the following dimensions: total length: 50 mm, width of narrow part: 3.3 mm, width at ends: 7 mm, length of narrow parallel part: 25 mm, thickness: 1 mm.

Resilience

The resilience of the thermoplastic moulding materials was tested with the aforementioned test specimens on a tensile/elongation machine from Zwick, by stretching a test specimen of the sample to be determined of starting length L1 by 300% to length L2, at an elongation rate of 50 mm/min. Subsequently, the test specimen was allowed to fully relax, i.e. the test specimen no longer changed its length at a force of 0 Pa. The resulting length corresponds to L3.

The resilience R in % is given as follows: R=((L2–L3)/L2–L1)*100

Oscillatory Rheometry Test Method

The Oscillatory Rheometry Test Method is used to measure the Storage Modulus and the Loss Factor of a polymer composition. A controlled-strain rotational rheometer (such as Discovery HR-3, TA Instruments, New Castle, DE, USA, or equivalent) capable of sample temperature control (using a Peltier cooler and resistance heater combination) with a precision equal to or exceeding 0.5° C. over at least the range of –0° C. to 150° C. The rheometer is operated in a parallel plate configuration with 20-mm stainless steel parallel-plate tooling.

A parallel plate gap of 1,000 μm is initially used in the method. To compensate for thermal expansion of the tooling, the gap is set to 1,000 μm, and a mapping of actual plate gap (as measured using a suitable standard test fluid) a function of temperature over the range –10° C. to 150° C. is performed. This mapping is then used throughout the determination of the Storage Modulus Parameter and the Loss Factor Parameter.

The rheometer is heated to 150° C., the polymer composition is introduced in the rheometer, the gap is set to 1,050 μm, excess protruding sample is trimmed, and the gap is then set to 1,000 μm. (The axial force control of the rheometer is set to 0 N and be maintained within ±0.1 N of force during the experiment, thereby thermal expansion/contraction of the sample itself is compensated by adjusting the gap in order to avoid overfilling or underfilling in addition to the abovementioned compensation of the tooling.) The rheometer is then allowed to cool to 130° C., at which point the measurement commences with temperature ramped from 130° C. to –10° C. at a constant rate of cooling of 2° C./min. The applied strain amplitude is 0.1%, and the frequency of oscillation is 1 Hz (that is, one cycle per second). The resulting oscillatory stress is recorded.

After this step, the sample temperature is set to 23° C. (temperature is ramped to this setpoint at a rate of 10° C./min), and the sample is allowed to rest for 4.0 hours at 23° C. At the end of this period, the temperature is set to 10° C. (temperature is ramped to this setpoint at a rate of 10°

C./min), the sample is equilibrated for 300 seconds at –10° C., and a second oscillatory rheology measurement is conducted (0.1% strain, frequency of oscillation of 1 Hz) while temperature is ramped upward to 130° C. at a constant rate of increase of 2° C./min.

From the first decreasing temperature sweep, the storage modulus G' is calculated and recorded at 100° C., and these values are reported in Pascals (Pa) to the nearest 1 Pa as the "Storage Modulus at 100° C.". From the first, decreasing temperature sweep, the loss factor (also known as tan delta) is calculated recorded at 100° C., and this dimensionless value is reported to the nearest hundredth as the "Loss Factor at 100° C.".

Extensional Test Method

The Extensional Test Method is used to determine the Yield Stress Parameter, the Max Stress Parameter, the True Strain at Break Parameter, and the Strain Hardening Index for a specimen of a polymer composition. A thin film specimen formed of polymer composition is analysed with a rotational rheometer fitted with a specialized fixture with counter rotating rollers, and the stress associated with extensional strain imparted is measured and recorded.

Instrumental Setup

A rotational rheometer (ARES G2, TA Instruments, New Castle, DE, USA, or equivalent) is fitted with a fixture that has counter rotating cylindrical rollers specifically designed for the interrogation of extension deformation of films. An example of a suitable fixture is the Extensional Viscosity Fixture, or EVF (EVF, TA Instruments, or equivalent). The rheometer is further fitted with a forced-convection oven FCO (FCO, TA Instruments, or equivalent) and cooling system (ACS 2, TA Instruments, or equivalent) capable of controlling temperate from at least –50 to 250° C. to a within a tolerance of 0.5° C.

Specimen Preparation

Approximately 10 g of the polymer composition is placed in a polytetrafluoroethane (PTFE) bowl and introduced into a vacuum oven. After 15 minutes at 170° C. at ambient pressure, the pressure is lowered to 10 mbar, and the polymer composition is subsequently held at 170° C. and at 10 mbar for 45 minutes to remove air bubbles from the polymer composition. The polymer composition is removed from the vacuum oven and allowed to cool to ambient lab conditions (23±2° C.) for 90±30 minutes, at which point the polymer composition is removed from the PTFE bowl and placed between 2 sheets of siliconized paper. A metal shim 0.50 mm in thickness is used in the heated press as a spacer to obtain a film thickness of 0.50 mm when pressed with a heated press at 90° C. and 10 Bar (instrument setting) for 60 seconds to a polymeric film. If 90° C. is insufficient to melt the polymer composition, a higher temperature (but the lowest temperature sufficient to melt the composition) is used. The film is stored at least 120 hours in the laboratory at 23±2° C. prior to testing. From the film individual specimens for measurement are punched with a sample cutter to the specimen dimensions of 20.0 mm by 10.0 mm by 0.50 mm. This specimen will be cut lengthways with a scissor to achieve a final width of 5±0.5 mm. The exact width and thickness will be determined with a digital caliper (Electronic Caliper PRO-MAX Fowler) to the nearest of 0.01 mm and entered into the rheometer software.

Measurement

The cylinders of the EVF are heated to 80° C. for 90±30 s in the forced-convection oven of the rheometer. Then a small droplet (0.03±0.01 g) of the polymer composition is applied to each cylinder. The used polymer composition should exhibit a high stiffness (G' at 23° C. greater than 10 MPa) to not interfere with the measurement. A specimen of polymer composition is quickly pressed into a molten polymer composition on the cylinders of the EVF to fix it to the cylinder surface. The specimen is placed perpendicular to the axis of rotation of the cylinders.

The specimen mounted on the EVF is then placed in the forced convection oven of the rheometer for thermal conditioning and is kept isothermal at 23±1° C. for 300±10 s. After this time has elapsed, the specimen is mechanically conditioned. To mechanically condition the specimen, the torque transducer is zeroed, and the sample is put under a pre-stretch rate of 0.001 s-1 for 0.30 s and then allowed to relax for 60 s. (In this method, all strain is expressed in terms of Hencky strain, also known as "true strain" or "logarithmic strain.")

The measurement is performed in the FCO oven at 23° C.±0.5° C. The strain rate extension for the measurement is 0.01 s-1, and the strain at maximum extension is 4.0. After measurement, the specimen is checked for rupturing. If it has ruptured, the location of the break is noted. If the rupture is approximately in the middle between the two cylinders of the EVF, the data collected are deemed acceptable. Otherwise, if the polymeric film break is at or close to the rotating cylinders, the results are discarded and the measurement performed again on a replicate specimen.

Analysis

For the extensional stress calculation, a constant volume is assumed. From the raw torque versus angular displacement data recorded by the rheometer, extensional stress (in megapascals, or MPa) versus Hencky strain data are calculated. The data are plotted in semi-logarithmic fashion with Hencky strain on the abscissa (linear scale) and extensional stress on the ordinate (logarithmic scale). A linear fit with a positive slope with an $R^2$ value of 0.9 or greater is set between a Hencky strain of 0.5 and 1. Otherwise, the maximum value of extensional stress recorded during the measurement is reported as the Yield Stress Parameter, again reported in MPa to the nearest kilopascal. The value of the fitted line at a Hencky strain of zero (that is, the y-intercept), is defined as the Yield Stress Parameter, which is reported in MPa to the nearest kilopascal. The maximum stress value in the plot is defined as the Maximum Stress Parameter, which is reported in MPa to the nearest kilopascal. The Hencky Strain, when the specimen ruptures and/or the reported torque value is lower than 100 µNm, is reported as Strain to Break Parameter as dimensionless value to the nearest of 0.1 (or, in the case it did not rupture during the measurement, to a strain of 4.0). The difference of the Maximum Stress and the Yield Stress divided by the Yield Stress is defined as Strain Hardening Index, which is reported as dimensionless value to the nearest of 1.

EXAMPLES

To produce the moulding materials according to the invention, the PbP was mixed with the SBC. The components used as SBC were styrene block copolymers from the manufacturer Kraton Corporation or DZBH New Material. The PbP used is Licocene® PPA 330 from the manufacturer Clariant.

The chemical, physical and mechanical properties of both components are each characterized in detail in Tables 1 and 2.

A) PbP

TABLE 1

| | PbP (Licocene ® PPA330) |
|---|---|
| Catalysis method used for production | Metallocene catalysis |
| Melt viscosity @170° C. [mPas] | 200 |
| Propylene content [% by weight] | 79.5 |
| $M_w$ [g/mol] | 6,400 |
| PDI | 1.5 |
| $T_g$ [° C.] | −44 |
| Melting enthalphy [J/g] | 0 |
| Pour point: [° C.] | 21 |
| Elongation at break [%] | Not determinable since not dimensionally stable |
| Strength [MPa] | Not determinable since not dimensionally stable |

B) PbP-g-ST or PbP-g-MA Polymer

Synthesis Example 1

2,500 g of the PbP according to Table 1 were heated to 165° C. in a glass apparatus equipped with stirrer, internal thermometer and distillation bridge under nitrogen atmosphere. Over 3 hours 250 g of freshly distilled styrene or maleic anhydride was added continuously, while simultaneously adding from a dropping funnel the continuous addition 25 g of di-tert.-butyl peroxide. After the end of the dosage, the reaction was allowed to continue for 1 hour. Subsequently a vacuum of about 20 mbar was applied to remove the volatile components A light-coloured pasty-liquid polymer was received showing the properties listed in Table 2.

TABLE 2

| | PbP-g-St (Styrene-grafted Licocene ® PPA 330) | PbP-g-MA (Maleic anhydride-grafted Licocene ® PPA 330) |
|---|---|---|
| Catalysis method used for production of polymer backbone | Metallocene catalysis | Metallocene catalysis |
| Styrene or Maleic anhydride content [% by weight] | 10 | 1 |
| Melt viscosity @170° C. [mPas] | 280 | 255 |
| Propylene content on PbP backbone [% by weight] | 79.5 | 79.5 |
| $M_w$ [g/mol] | 9,240 | 6,120 |
| PDI | 1.9 | 1.6 |
| $T_g$ [° C.] | −44 | −43.2 |
| Melting enthalphy [J/g] | 0 | 0 |
| Pour point: [° C.] | 45° C. | 35° C. |

C) SBC Components

TABLE 3

| | Kraton MD 1648 | Kraton MD6951 | Kraton MD 1653 | Kraton G1730 | Kraton G 1657 | DZBH 506 |
|---|---|---|---|---|---|---|
| Melting enthalpy [J/g] | 0 J/g | 0 J/g | 0 J/g | 0 J/g | 0 J/g | 0 J/g |
| Elongation at break [%] | 750 | 750 | 600 | 800 | 750 | 900 |

TABLE 3-continued

| | Kraton MD 1648 | Kraton MD6951 | Kraton MD 1653 | Kraton G1730 | Kraton G 1657 | DZBH 506 |
|---|---|---|---|---|---|---|
| Strength [MPa] | 11 | 18 | 48 | 20 | 23 | 5 |
| Melt flow rate MFR (230° C./2.16 kg [g/10 min]) | 220 | 48 | 27 | 11* | 22* | 5 |
| Styrene content (% by weight) | 20 | 34 | 30 | 20 | 13 | 13 |
| Iodine number [g of $I_2$/100g of polymer] | 3.65 | 3.0 | 1.45 | 2.85 | 2.65 | 37 |
| $M_w$ [g/mol] | 73,500 | 133,300 | 64,060 | 103,300 | 104,600 | 167,300 |
| Type | Triblock SEBS | Triblock SEBS | Triblock SEBS | Triblock SEPS | Triblock SEBS | Triblock SEBS |

*At 5 kg

D) Tackifier

To produce the thermoplastic moulding materials, a resin-based tackifier was partially blended with the two polymers. The following commercially available tackifiers were used:
    a) Regalite 9100 (Eastman)
    b) Sukorez SU400 (Kolon)

Melt mixtures of the components were produced by melt extrusion from the polymers described in Tables 1 and 2, optionally the tackifier and optionally further additives, in particular antioxidants. This was achieved using a co-rotating twin-screw extruder at a speed of 130 rpm and a processing temperature of 230° C.

The following antioxidants were added to produce the thermoplastic moulding materials:
    Antioxidant 1: Hostanox®, a sterically hindered phenol, manufactured by Clariant;
    Antioxidant 2: Hostavin®, a hindered amine light stabilizer (HALS), manufactured by Clariant.

Evaluation

The comparative examples show comparative mixtures which are either resin-free mixtures of non-inventive propylene-based polymers with SBCs or mixtures of inventive propylene-based polymers with other polyolefins.

The following properties were determined from the hot melt adhesive compositions thus produced:
    melt viscosity at 170° C.,
    elongation at break in [%]
    resilience [%].

To ensure the sprayability of the thermoplastic moulding material, its melt viscosity at 170° C. should be less than or equal to 30,000 mPas.

The following scheme is used to classify the mechanical properties:

TABLE 4

| Classification | Inadequate (C) | Inventive: (B), sufficient for some applications | Preferred: (A), for specific applications |
|---|---|---|---|
| Elongation at break | X < 800% | 800% ≤ X < 1,000% | X ≥ 1,000% |
| Resilience | X < 70% | 70% ≤ X < 90% | X ≥ 90% |

Working Examples (Inventive)/(Amounts Used in % by Weight)

TABLE 5

| | AE 1 | AE 2 | AE 3 | AE 4 | AE 5 | AE6 | AE7 | AE8 | AE9 | AE10 |
|---|---|---|---|---|---|---|---|---|---|---|
| PbP-g-ST | | | | | | | | | | |
| PbP-g-MA | | | | | | | | | | |
| PbP-ng | 25 | 30 | 30 | 30 | 24 | 22 | 64.4 | 50.5 | 50 | 69.3 |
| Kraton MD1648 | 40 | | | 12.5 | 36 | 33 | | | | |
| Kraton MD 6951 | | 25 | | | | | 27.7 | 27.7 | | |
| Kraton MD 1653 | | | 25 | 12.5 | | | | | | |
| Kraton G1730 | | | | | | | 6.9 | 6.9 | | |
| Kraton G 1657 | | | | | | | | | | |
| DZBH 506 | | | | | | | | | 25 | 29.7 |
| Regalite 9100 | | 44.3 | 44.3 | | | | | | | |
| Sukorez SU400 | 34.3 | | | 44.3 | 39.3 | 44.3 | | 13.9 | 24 | |
| Antioxidant 1 | 0.5 | 0.5 | 0.5 | 0.5 | 0.5 | 0.5 | 0.7 | 0.7 | 0.7 | 0.7 |
| Antioxidant 2 | 0.2 | 0.2 | 0.2 | 0.2 | 0.2 | 0.2 | 0.3 | 0.3 | 0.3 | 0.3 |
| Melt viscosity@170° C. [mPa · s] | 4,205 | 4,509 | 3,212 | 3,290 | 3,400 | 2,710 | 3,500 | 7,000 | 9,000 | 29,000 |
| elongation at break [%] | 1.052 | 1.487 | 1.005 | 1.161 | 1.001 | 1.201 | 1.103 | 1.304 | 1.247 | 885 |
| (Classification) | (A) | (A) | (A) | (A) | (A) | (A) | (A) | (A) | (A) | (B) |
| Resilience at 300% [%] | 98.5 | 98.5 | 98.5 | 98.2 | 98.5 | 99.7 | 97.6 | 98.2 | 99.4 | 99.4 |
| (Classification) | (A) | (A) | (A) | (A) | (A) | (A) | (A) | (A) | (A) | (A) |
| Tensile strength [MPa] | 5.8 | 6.9 | 6.8 | 5.8 | 4.8 | 5 | 2.8 | 5.4 | 2.6 | 0.7 |

TABLE 6

| | AE11 | AE12 | AE13 | AE14 | AE15 | AE16 | AE17 | AE18 | AE19 | AE20 |
|---|---|---|---|---|---|---|---|---|---|---|
| PbP-g-ST | 9.9 | | 29.7 | | 69.3 | 34.7 | 64.4 | | | |
| PbP-g-MA | | | | | | | | 10.0 | 10.0 | 64.0 |
| PbP-ng | 54.5 | 30 | 34.7 | 59.4 | | 34.6 | | 54.0 | 49.0 | |
| Kraton MD1648 | | 25 | | | | | | | | |
| Kraton MD 6951 | 27.7 | | 27.7 | 36.6 | | | 27.7 | 28.0 | 40.0 | 28.0 |
| Kraton MD 1653 | | | | | | | | | | |
| Kraton G1730 | 6.9 | | 6.9 | 3 | | | 6.9 | 7.0 | | 7.0 |
| Kraton G 1657 | | | | | 29.7 | | | | | |
| DZBH 506 | | | | | | 29.7 | | | | |
| Regalite 9100 | | | | | | | | | | |
| Sukorez SU400 | | 44.3 | | | | | | | | |
| Antioxidant 1 | 0.7 | 0.5 | 0.7 | 0.7 | 0.7 | 0.7 | 0.7 | 0.7 | 0.7 | 0.7 |
| Antioxidant 2 | 0.3 | 0.2 | 0.3 | 0.3 | 0.3 | 0.3 | 0.3 | 0.3 | 0.3 | 0.3 |
| Melt viscosity@170° C. [mPa · s] | 5,500 | 1,400 | 11,000 | 10,000 | 10,750 | 3,700 | 3,500 | 10,750 | 3,700 | 18,000 |
| elongation at break [%] | 882 | 1,189 | 950 | 942 | 1,049 | 1,156 | 831 | 1,049 | 1,156 | 1,120 |
| (Classification) | (B) | (A) | (B) | (B) | (A) | (A) | (B) | (A) | (A) | (A) |
| Resilience at 300% [%] | 97.6 | 95.5 | 98.5 | 98.9 | 98.2 | 97.8 | 97.6 | 98.2 | 97.8 | 98.3 |
| (Classification) | (A) | (A) | (A) | (A) | (A) | (A) | (A) | (A) | (A) | (A) |
| Tensile strength [MPa] | 1.7 | 3.6 | 1.8 | 1.3 | 2.4 | 3.8 | 2.9 | 2.4 | 3.8 | 2.1 |

TABLE 7

| | AE21 | AE22 | AE23 | AE24 |
|---|---|---|---|---|
| PbP-g-ST | | | | |
| PbP-g-MA | | | | |
| PbP-ng | 30 | 30 | 25 | 30 |
| Kraton MD 1648 | | | | |
| Kraton MD 6951 | | | 5 | 5 |
| Kraton MD 1653 | 25 | | 20 | 20 |
| Kraton G1730 | | 25 | | |
| Kraton G 1657 | | | | |
| DZBH 506 | | | | |
| Regalite 9100 | | | | |
| Sukorez SU400 | 44 | 44 | 49 | 44 |
| Antioxidant 1 | 0.5 | 0.5 | 0.5 | 0.5 |
| Antioxidant 2 | 0.5 | 0.5 | 0.5 | 0.5 |

TABLE 7-continued

| | AE21 | AE22 | AE23 | AE24 |
|---|---|---|---|---|
| Melt viscosity@170° C. [mPa · s] | 3,000 | 9,300 | 3,600 | 3,900 |
| elongation at break [%] | 950 | 1,200 | 960 | 930 |
| (Classification) | (B) | (A) | (B) | (B) |
| Resilience at 300% [%] | 97.3 | 98.9 | 97.3 | 96.9 |
| (Classification) | (A) | (A) | (A) | (A) |
| Tensile strength [MPa] | 6.8 | 5.3 | 4.9 | 4.0 |

The thermoplastic moulding materials according to the invention have at least a (B) classification in both categories.

Comparative Examples (Non-Inventive)/(Amounts Used in % by Weight)

TABLE 8

| | AV 1 | AV 2 | AV 3 | AV 4 | AV 5 | AV 6 | AV7 |
|---|---|---|---|---|---|---|---|
| Licocene PP 2502 | 50 | 40 | | 69 | | | 59 |
| Licocene PP 1302 | | | 40 | | | | |
| PbP | | | | | 59 | 50 | 10 |
| Vistamaxx 6502 | | | | 30 | 40 | 49 | 30 |
| Kraton MD 1648 | 49 | 59 | 59 | | | | |
| Kraton G 1657 | | | | | | | |
| Antioxidant 1 | 0.7 | 0.7 | 0.7 | 0.7 | 0.7 | 0.7 | 0.7 |
| Antioxidant 2 | 0.3 | 0.3 | 0.3 | 0.3 | 0.3 | 0.3 | 0.3 |
| Melt viscosity @ 170° C. [mPa · s] | 70,000 | 116,000 | 30,860 | 27,060 | 8,252 | 11,040 | 11,110 |
| Tensile strength [MPa] | 6.1 | 4.9 | 3.7 | 11.0 | 1.1 | 1.5 | 11.0 |
| Elongation at break [%] | 815 | 635 | 666 | 1,250 | 328 | 419 | 1,121 |
| (Classification) | (B) | (C) | (C) | (A) | (C) | (C) | (A) |
| Resilience at 300% [%] | 76.3 | 89.7 | 94.1 | 26.5 | 76.5 | 75.0 | 45.6 |
| (Classification) | (B) | (B) | (A) | (C) | (B) | (B) | (C) |

The inventive examples show significantly better values for the critical mechanical properties in comparison to the comparative examples. For instance, the invention combines a low melt viscosity with a high elongation at break and a high resilience. Formulations which have good mechanical properties but are not sprayable were just as unable to solve the objective technical problem of the invention as formulations which have low melt viscosities but at least one insufficient mechanical property. Only the inventive examples have both a sufficiently low melt viscosity as well as reasonable elongation at break as well as adequate resilience to be suitable for achieving sprayable web applications.

Additional properties were further measured as compiled in Table 8 and 9:

TABLE 9

| | Desired properties | AE 1 | AE 2 | AE 3 | AE 4 | AE 5 | AE 6 | AE 9 | AE 10 | AE 12 |
|---|---|---|---|---|---|---|---|---|---|---|
| Storage Modulus @100° C.[Pa] | >200 Pa | 6,530 | 17,992 | 26,800 | 1,370 | 2,380 | 865 | 9,390 | 5,338 | 192 |
| tan δ @ 100° C. | <5 | 2.7 | 0.6 | 1.0 | 4.5 | 4.3 | 6.9 | 0.72 | 1.08 | 10.88 |
| Yield Stress @ 23° C. [Mpa] | <2 MPa | 0.09 | 0.06 | 0.09 | 0.06 | 0.09 | 0.10 | 0.02 | 0.02 | 0.09 |
| True Strain at Break @ 23° C. | >2.2 | 2.8 | 3.5 | 2.6 | 2.8 | 2.9 | 2.9 | 2.9 | 3.1 | 2.8 |
| Strain Hardening Index @) 23° C. | >25 | 591 | 2,010 | 473 | 550 | 597 | 568 | 663 | 650 | 315 |

TABLE 10

| | Desired properties | AE 13 | AE 14 | AE 15 | AE 16 | AE 21 | AE 22 | AE 23 | AE 24 |
|---|---|---|---|---|---|---|---|---|---|
| Storage Modulus @100° C.[Pa] | >200 Pa | 7,452 | 3,187 | 12,352 | 1,500 | 26,481 | 10,874 | 3,792 | 6,090 |
| tan δ @ 100° C. | <5 | 0.66 | 0.95 | 0.88 | 0.88 | 1.0 | 1.4 | 2.9 | 2.2 |
| Yield Stress @ 23° C. [MPa] | <2 MPa | 0.03 | 0.04 | 0.03 | 0.002 | 0.06 | 0.06 | 0.19 | 0.13 |
| True Strain at Break @ 23° C. | >2.2 | 2.9 | 3.4 | 2.9 | 2.2 | 2.52 | 3.35 | 2.75 | 2.76 |
| Strain Hardening Index @ 23° C. | >25 | 123 | 128 | 302 | 209 | 467 | 1265 | 384 | 313 |

Tables 9 and 10 show additional mechanical properties which are relevant for the application as stable net structures. The parameters of importance, namely Yield Stress, the True Strain at Break and the Strain Hardening Index fulfil all requirements for mechanical stability of spray web applications. By this the material does not fail instantly at high local stresses, which leads to a significant increase of net structure extensibility.

The invention claimed is:

1. A thermoplastic moulding material comprising
   (a) from 20 to 45% by weight, based on the total mass of the thermoplastic moulding, of one or more styrene block copolymers, wherein the one or more styrene block copolymers have a styrene content of from 5 to 40% by weight, based on the total mass of the one or more styrene block copolymers; and
   (b) from 20 to 75%, by weight, based on the total mass of the thermoplastic moulding, of one or more propylene-based polymers comprising a propylene-based polymer backbone, wherein the propylene-based polymer backbone is a linear propylene-based polymer having a weight-average molecular weight Mw of less than 10,000 g/mol, and wherein the one or more propylene-based polymers have a melting enthalpy, measured in accordance with ISO 11357-2, of below 50 J/g and a melt viscosity at 170° C., measured in accordance with DIN 53019, of from 1 to 1000 mPa·s.

2. The thermoplastic moulding material according to claim 1, wherein at least one of the one or more propylene-based polymers is grafted with one or more selected from
   1 to 50% by weight, based on the weight of the propylene-based polymer backbone, of vinyl-aromatic monomers, and
   0.1 to 20% by weight, based on the weight of the propylene-based polymer backbone, of unsaturated vinyl monomers including a heteroatom,
   to form a grafted propylene-based polymer.

3. The thermoplastic moulding material according to claim 2, wherein the grafted propylene-based polymer has a pour point, determined according to ASTM D97, of below 85° C.

4. The thermoplastic moulding material according to claim 1, wherein the one or more propylene-based polymers comprise
   at least one propylene-based polymer with a pour point, determined according to ASTM D97, of below 50° C.;
   at least one propylene-based polymer with a glass transition temperature Tg, determined by DSC in accordance with DIN EN ISO 11357-2, of less than −20° C.; or
   mixtures of these.

5. The thermoplastic moulding material according to claim 1, wherein the one or more propylene-based polymers include at least one propylene-based polymer that is not grafted and at least one propylene-based polymer that is grafted with (i) vinyl-aromatic monomers or (ii) unsaturated vinyl monomers including a heteroatom.

6. The thermoplastic moulding material according to claim 5, wherein the propylene-based polymer backbone of the at least one propylene-based polymer that is not grafted is the same as the propylene-based polymer backbone of the at least one propylene-based polymer that is grafted.

7. The thermoplastic moulding material according to claim 1, wherein the one or more propylene-based polymers each comprise a propylene-based polymer backbone made up of random copolymers of propylene produced by metallocene catalysis and having a propylene proportion of less than 90% by weight.

8. The thermoplastic moulding material according to claim 1, wherein the one or more styrene block copolymers have a weight-average molecular weight $M_w$ of more than 30,000 g/mol.

9. The thermoplastic moulding material according to claim 1, comprising from 25 to 40% by weight of one or more styrene block copolymers, based on the total mass of the thermoplastic moulding material.

10. The thermoplastic moulding material according to claim 1, wherein the one or more styrene block copolymers comprise at least one elastomeric block copolymer selected from the group consisting of elastomeric triblock copolymers of the ABA type, elastomeric diblock copolymers of the AB type, and elastomeric multiblock copolymers, of the type $[AB]_n$, wherein A consists of rigid styrene units, B consists of elastomeric styrene units, and n is the number of styrene blocks.

11. The thermoplastic moulding material according to claim 1, wherein the melt viscosity of the thermoplastic moulding material at 170° C., measured in accordance with DIN 53019, is between 100-30,000 mPa·s.

12. The thermoplastic moulding material according to claim 1, wherein the material has an elongation at break of more than 800% and a resilience R of more than 70%.

13. The thermoplastic moulding material according to claim 1, wherein the thermoplastic moulding material comprises less than 0.1% by weight of tackifier.

14. The thermoplastic moulding material according to claim 1, wherein the thermoplastic moulding material comprises from 35 to 70% by weight of the one or more propylene-based polymers, based on the total mass of the thermoplastic moulding.

15. The thermoplastic moulding material according to claim 1, wherein the one or more propylene-based polymers have a melting enthalpy, measured in accordance with ISO 11357-2, of between 0 and 5 J/g.

16. The thermoplastic moulding material according to claim 1, wherein the one or more propylene-based polymers have a melt viscosity at 170° C., measured in accordance with DIN 53019, of from 1 to 500 mPa·s.

17. The thermoplastic moulding material according to claim 1, wherein the thermoplastic moulding material comprises less than 0.1% by weight of mineral, naphthenic, and paraffinic oils.

18. A hot melt adhesive consisting of the thermoplastic moulding material according to claim 1.

* * * * *